United States Patent [19]

Penington

[11] 3,994,362
[45] Nov. 30, 1976

[54] HYDRAULICALLY OPERATED STEER AXLE LINKAGE

[75] Inventor: Jeffrey Penington, Burlington, Canada

[73] Assignee: Allis-Chalmers Corporation, Milwaukee, Wis.

[22] Filed: Jan. 12, 1976

[21] Appl. No.: 648,319

[52] U.S. Cl. ............................... 180/156; 280/111
[51] Int. Cl.² .......................................... B62D 5/06
[58] Field of Search ............ 180/153, 154, 155, 156, 180/157, 158, 159, 160, 161, 162, 43 R; 280/111

[56] References Cited
UNITED STATES PATENTS

| 2,732,904 | 1/1956 | Schroeder | 180/154 |
| 2,797,764 | 7/1957 | Wysong et al. | 180/157 |
| 2,994,396 | 8/1961 | Bidwell | 180/156 |

FOREIGN PATENTS OR APPLICATIONS

| 1,186,343 | 1/1965 | Germany | 180/157 |

Primary Examiner—Philip Goodman
Assistant Examiner—John A. Pekab
Attorney, Agent, or Firm—Charles L. Schwab

[57] ABSTRACT

An improved Ackerman steering linkage for a steer axle maximizing steering forces available from a given hydraulic system pressure and minimizing space requirements. The lengths of the steer arms and quadrant are minimized by interconnecting a hydraulic steering jack to the quadrant on the diametrically opposite side of its pivot to the axle from its points of connection with the tie rods. Both ends of the steering jack impart steering forces to the steering linkage thereby reducing the design specification for the effective pressure area of the jack. The steering geometry improves the steering torque available at extreme steer positions, thus permitting a smaller diameter steering jack to be used. The improved steering linkage employs components which are sufficiently small to fit within the rims of wheels rotatably mounted on the wheel spindles on opposite lateral ends of the axle.

10 Claims, 5 Drawing Figures

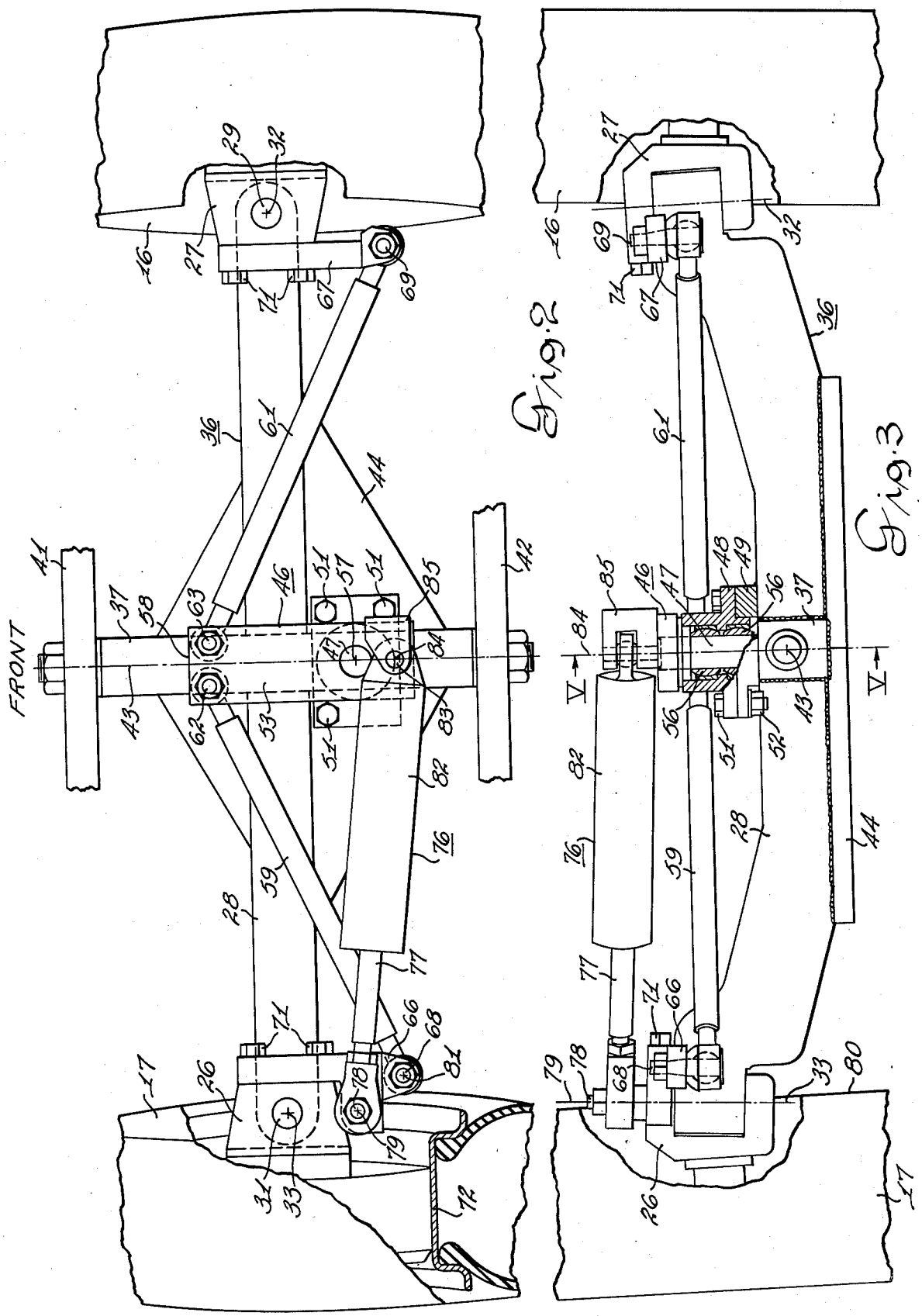

HYDRAULICALLY OPERATED STEER AXLE LINKAGE

BACKGROUND OF THE INVENTION

In prior art Ackerman steering systems, the steering jack is customarily anchored at one end to either the steering axle or to the vehicle frame.

BRIEF DESCRIPTION OF THE INVENTION

In the present invention, an oscillating axle is provided with a central steering guadrant and links extending from one longitudinal end thereof to steer arms on wheel spindles mounted at opposite ends of the axle for steering movement about substantially vertical axes. A hydraulic steering jack is pivotally connected at one end to one of the steer arms and at its other end to the steering quadrant on the diametrically opposite side of the quadrant pivot axis from the points of connection with the steering links therewith. The linkage geometry improves the effective lever arm length at an extreme steering position thereby permitting a smaller diameter jack to be employed for steering than would otherwise be required. Both ends of the jack apply steering force to the steering linkage and thus the size of the steering jack can be smaller than otherwise would be necessary. This improved steering linkage permits the use of a hydraulic system with normal pressures and thus commercially available components can be utilized. This avoids the added cost of high pressure hydraulic components for a high pressure system which would otherwise be required utilizing prior art configurations.

BRIEF DESCRIPTION OF THE DRAWINGS

One embodiment of the present invention is illustrated in the drawings wherein:

FIG. 2 is a top view of the lift truck steering axle incorporating the present invention;

FIG. 3 is a rear view of the steering axle shown in FIG. 2;

DETAILED DESCRIPTION OF THE INVENTION

Figure 1:
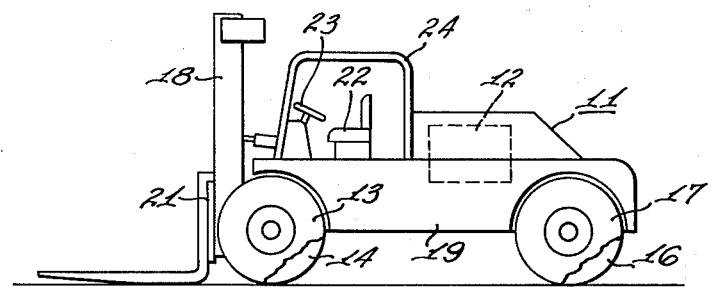
FIG. 1 is a side view of a large outdoor lift truck.

Referring to FIG. 1, a large counterweighted lift truck 11 includes an engine 12 connected in driving relation to a pair of front drive wheels 13, 14 by means not shown, and a pair of rear steerable wheels 16, 17. A mast 18 is connected to the front of the truck frame 19 and supports a fork carriage 21 for vertical, reciprocal movement. The operator's station 22 is provided with a steering wheel 23 and is protected by an overhead guard 24.

Referring to FIGS. 2 and 3, the steerable wheels 16, 17 are rotatably carried on wheel spindles 26, 27, which are pivotally connected to laterally opposite ends of an axle 28 by pins 29, 31 for steering movement about generally vertical axes 32, 33. In addition to the beforementioned components, the steering axle assembly 36 includes a longitudinal member 37 having its opposite ends pivotally connected to the walls 41, 42 of the truck frame 19. Thus, the axle assembly 36 is free to pivot about a longitudinal horizontal axis 43. A horizontally disposed diamond-shaped plate 44 is welded to the axle 28 and the longitudinal member 37 to enhance the strength of the axle structure. A steering quadrant 46 includes a downwardly extending pivot shaft 47 rotatably mounted in a bearing housing 48 by a pair of spherical bearings 56 for pivotal movement about a vertical pivot axis 57.

The bearing housing 48 is detachably secured to a mounting plate 49 by a plurality of bolts 51 and nuts 52 and the plate 49 is rigidly secured as by welding to the longitudinal member 37. The vertical pin 47 of the steering quadrant 46 is rigidly secured to longitudinally extending part 53 of the steering quadrant 46 as by welding. The steering quadrant 46 extends longitudinally forward from its pivot axis 57 terminating in a squared-off end 58 to which the adjacent, laterally inner ends of tie rods 59, 61 are pivotally connected by suitable pivot members 62, 63. The laterally outer ends of the tie rods 59, 61 are pivotally connected to steering arms 66, 67 by a pair of pivot members 68, 69. The steering arms 66, 67 are releasably secured to the wheel spindles 26, 27 by cap screws 71.

A hydraulic actuator in the form of a double acting hydraulic jack 76 has a pair of relatively extensible and contractable components, the rod component 77 of which has its laterally outer end pivotally connected to the steering arm 66 by a pivot member 78 at a point thereon closer to the steering axis 33 of wheel 17 than the pivot member 68. The cylinder component 82 of the jack 76 is pivotally connected to the steering quadrant 46 by a pin 83 whose axis 84 is spaced from the quadrant pivot axis 57 in the diametrically opposite longitudinal direction from the direction the tie rod pivot connections to the quadrant are spaced from the quadrant axis 37. As shown in FIG. 2, it will also be noted that the pivot axis 79 of the pivot member 78 is substantially longitudinally in line with the steer axis 33 of wheel 17 and in close proximity to the vertical plane 80 defined by the edge of the wheel rim 72. In other words, the axes 79 and 33 are substantially aligned in the direction of steering of wheel 17. It will also be noted that the axis 79 and the wheel steer axis 33 are disposed laterally outwardly from the axis 81 of pivot member 68 by which the laterally outer end of tie rod 59 is connected to the steer arm. This positioning of the pivot member 78 is within the diameter and confines of the rim 72 of the wheel 17.

Figure 4:
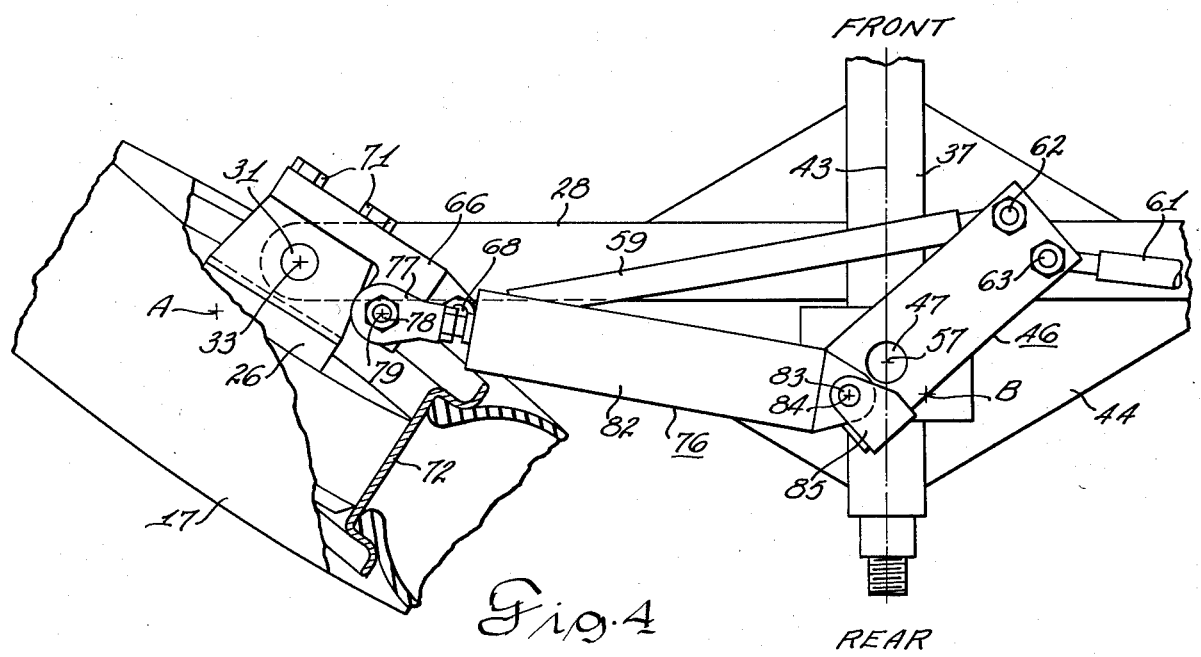
FIG. 4 is a top view of a part of the steering axle shown in FIG. 2 showing the steering linkage in an extreme position of steering.
Figure 5:
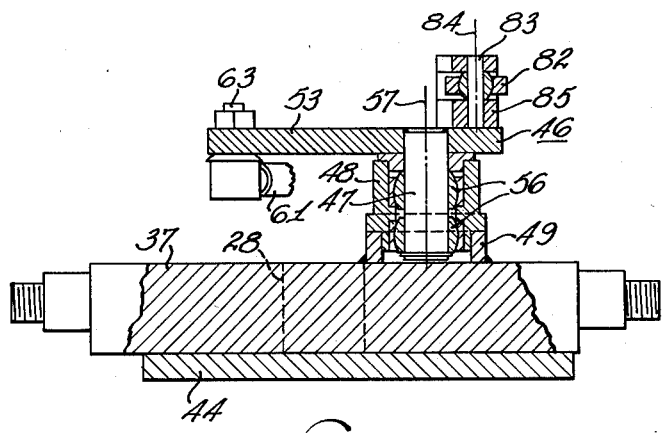
FIG. 5 is a section along the line V—V in FIG. 3.

Referring to FIG. 4, the wheel 17 has been steered to an extreme steered position of 57 degrees from straight ahead position. In this condition, wherein the steering jack has been substantially completely contracted, the effective lever arm for the steering torque supplied by the hydraulic jack 76 to the wheel 17 is reduced to a small dimension. In this extreme steered condition, it will be noted that the axis 84 of pivot pin 83 has moved forwardly and laterally on an arc about the pivot axis 57 of the steering quadrant 46. The forward longitudinal movement of the anchor point axis 84 of the jack increases the effective steering lever arm for the jack steering forces against the wheel 17 in the illustrated extreme steered position of the spindle 26 and the associated wheel 17.

It will be noted that as the jack is contracted to its position shown in FIG. 4 the cylinder end of the jack 76 is pulling on the steering quadrant 46 through the connection of the pivot pin 83 to the bracket 85 welded to the quadrant part 53 thereby causing the quadrant 46 to rotate in a clockwise direction as viewed in FIG. 4. This transmits a pulling force on the rod 59 which in turn pulls on the steering arm 66 to urge it to rotate in a counterclockwise direction about the wheel steer axis 33. This occurs at the same time the rod component 77 is pulling on the steering arm 66 urging it to rotate in a counterclockwise direction. Thus, both ends of the hydraulic jack 76 impart forces urging the wheel spindle 17 to rotate in a counterclockwise direction. It will also be noted that the steering jack 76 is imparting forces to both ends of the steering quadrant to cause it to rotate in a clockwise direction. The present invention utilizes the forces exerted by both ends of the steering jack 76 thus permitting a smaller diameter steering jack to be used to produce the same steering effort as would be achieved with a larger diameter steering jack anchored to the steering axle or frame of the vehicle rather than to the steering quadrant as illustrated. As hereinbefore mentioned, the pivot pin 83 will swing on an arc about the vertical pivot axis 57 of the steering quadrant 46 to a position closer to the steering axle 28 as the maximum steered position of the wheel 17 in one direction is effected (as illustrated in FIG. 4). This movement of the cylinder end of the jack 76 toward the axle 28 improves the effective lever arm for steering forces imparted by the rod end of the jack to the steering arm 66 to cause turning of the wheel 17. The effective lever arm is smallest in the illustrated extreme steered condition, thus the working diameter (cylinder bore diameter) is determined by the steering force requirement in this condition.

OPERATION

The double acting hydraulic jack 76 is controlled by a steering valve (not shown) operated by the steering wheel 23 of the lift truck 11. When it is desired to rotate the wheels 16, 17 counterclockwise as viewed in FIG. 2, the steering jack 76 is contracted. The contracting of jack 76 to move the wheels counterclockwise will cause the vehicle 11 to turn to the right.

When it is desired to steer the vehicle to the left, the double acting hydraulic steering jack 76 is extended thus causing the wheels 16, 17 to rotate about the steering axes 32, 33 in a clockwise direction as viewed in FIG. 2. In the extreme steered condition with the hydraulic jack in its extended condition, the axis 79 of the pivot member 78 will be moved to point A as viewed in FIG. 4 and the axis 84 of pivot pin 83 will move to point B. It will be noted that the effective lever arm of the hydraulic jack 76 for steering in the extreme extended position of jack 76 has been decreased slightly from that which would exist had the axis 84 not swung from its position as illustrated in FIG. 2 to the point B as shown in FIG. 4. This does not give rise to any requirement for a larger diameter steering jack because the effective lever arm for steering the wheel 17 is the same or greater in this extreme steered condition of the wheel 17 as compared to the effective lever arm in the steered condition illustrated in FIG. 4, wherein the hydraulic jack 76 is contracted.

In order to provide a heavy duty outdoor lift truck at a reasonable cost, it is desirable to use commercially available components rather than expensive special purpose components. For this reason it is desired to employ a hydraulic system which uses a pressure level compatible with reasonably priced hydraulic components. The present invention permits utilization of a hydraulic system for steering which employs a reasonable pressure level by virtue of the fact that the hydraulic cylinder 76 may be kept at a reasonable diameter to achieve the angle of steering desired and still fit within the space available in the rear counterweight area of the lift truck. A small diameter steering jack may be used because the hydraulic jack 76 when actuated is imparting forces from both ends tending to effect steering movement of the wheels. This is achieved by connecting one end of the steering jack to the steering quadrant in diametrically opposed relation to the connections of the tie rods to the steering quadrant. In summary the present invention uses the opposite directed linear forces available from the steering jack to actuate the steering linkage thus permitting a smaller diameter jack to perform the steering work which would normally required a larger diameter jack.

The embodiments of the invention in which an exclusive property or privilege is claimed are defined as follows:

1. A steering linkage for a vehicle having a vehicle steer axle assembly including an axle with a pair of wheel spindles pivotally connected at laterally opposite ends thereof for steering movement about generally vertical steering axes, said spindles being adapted to receive wheels with rims of a predetermined diameter, said steering linkage comprising:
   a steering quadrant pivotally mounted on a central part of said axle for pivotal movement about a substantially vertical axis,
   a steer arm rigidly secured to each of said spindles,
   a pair of laterally extending tie rods having their laterally outer ends pivotally connected to said arms, respectively, and their laterally inner ends pivotally connected to said quadrant at points in spaced relation to said vertical axis in one horizontal direction, and
   an extensible and contractible hydraulic jack having one end pivotally connected to one of said spindles in spaced relation to its steer axis and its other end pivotally connected to said quadrant at a point in spaced relation to said vertical axis in a horizontal direction substantially opposite to said one direction.

2. The steering linkage of claim 1 wherein said one end of said jack is pivotally connected to the steer arm of said one spindle.

3. The steering linkage of claim 2 wherein, during straight ahead steering, said steering quadrant is longitudinally aligned with said vehicle and said pivot connection of said jack to said steer arm of said one spindle is substantially in longitudinal alignment with the steering axis of said one spindle.

4. The steering linkage of claim 2 wherein said steer arms extend from said spindles in one longitudinal direction and said one horizontal direction of said quadrant extends in the opposite longitudinal direction from its pivot connection with said axle.

5. The steering linkage of claim 1 wherein said steer arms do not extend beyond said rims of said wheels.

6. The steering linkage of claim 5 wherein said pivot connection between said jack and said one spindle is in close proximity to the plane defined by the inner lateral edge of said rim of said wheel on said one spindle.

7. The steering linkage of claim 6 wherein said one end of said jack is pivotally connected to the steer arm of said one spindle.

8. The steering linkage of claim 1 wherein the pivot connection between said jack and said one spindle is closer to the steer axis of said one spindle than the pivot connection between the associated tie rod and said steer arm secured to said one spindle.

9. The steering linkage of claim 8 wherein said one horizontal direction is one longitudinal direction and said steer arms extend from the spindles in the opposite longitudinal direction.

10. The steering linkage of claim 1 wherein the steer axis of said one spindle on said axle and the pivot connection between said jack and said one spindle are aligned in the direction of steering of the wheel on said one spindle.

* * * * *

UNITED STATES PATENT OFFICE
CERTIFICATE OF CORRECTION

Patent No. 3,994,362          Dated   November 30, 1976

Inventor(s)   Jeffrey Penington

It is certified that error appears in the above-identified patent and that said Letters Patent are hereby corrected as shown below:

On the Cover Sheet, "(73) Assignee: Allis-Chalmers Corporation, Milwaukee, Wis." should read ---
(73) Assignee: Allis-Chalmers, Rumely, Ltd., Guelph, Ontario, Canada. ---

Signed and Sealed this

Eighth Day of March 1977

[SEAL]

*Attest:*

RUTH C. MASON
*Attesting Officer*

C. MARSHALL DANN
*Commissioner of Patents and Trademarks*